(12) United States Patent
Koschany

(10) Patent No.: US 7,169,494 B2
(45) Date of Patent: Jan. 30, 2007

(54) FUEL CELL ARRANGEMENT AND METHOD FOR OPERATION THEREOF

(75) Inventor: Arthur Koschany, Salzweg (DE)

(73) Assignee: Manhattan Scientifics, Inc., New York, NY (US)

( * ) Notice: Subject to any disclaimer, the term of this patent is extended or adjusted under 35 U.S.C. 154(b) by 496 days.

(21) Appl. No.: 10/250,298

(22) PCT Filed: Dec. 19, 2001

(86) PCT No.: PCT/DE01/04803

§ 371 (c)(1),
(2), (4) Date: Aug. 27, 2003

(87) PCT Pub. No.: WO02/054516

PCT Pub. Date: Jul. 11, 2002

(65) Prior Publication Data

US 2004/0072041 A1    Apr. 15, 2004

(30) Foreign Application Priority Data

Dec. 29, 2000 (DE) .............................. 100 65 269

(51) Int. Cl.
*H01M 8/04* (2006.01)
*H01M 8/06* (2006.01)

(52) U.S. Cl. .................... 429/23; 429/19; 429/22

(58) Field of Classification Search ............ None
See application file for complete search history.

(56) References Cited

U.S. PATENT DOCUMENTS

| 4,436,793 A | * | 3/1984 | Adlhart | 429/17 |
|---|---|---|---|---|
| 5,372,617 A | * | 12/1994 | Kerrebrock et al. | 48/61 |
| 5,593,640 A | * | 1/1997 | Long et al. | 422/111 |
| 5,833,934 A | | 11/1998 | Adlhart | |
| 6,358,488 B1 | * | 3/2002 | Suda | 423/657 |
| 6,592,741 B2 | * | 7/2003 | Nakanishi et al. | 205/343 |
| 6,653,005 B1 | * | 11/2003 | Muradov | 429/19 |
| 2001/0022960 A1 | * | 9/2001 | Kojima et al. | 423/657 |

FOREIGN PATENT DOCUMENTS

| DE | 10065269 | 10/2002 |
|---|---|---|
| EP | 1170249 | 1/2002 |
| WO | WO00/63993 | 10/2000 |

OTHER PUBLICATIONS

Schlesinger et al.; *Sodium Borohydride, Its Hydrolysis and its Use as a Reducing Agent and in the Generation of Hydrogen*; Journal of the American Chemical Society; vol. 75, No. 1; pp. 215-219; Jan. 5, 1953.

* cited by examiner

Primary Examiner—Patrick Joseph Ryan
Assistant Examiner—Karie O'Neill
(74) Attorney, Agent, or Firm—James Creighton Wray

(57) ABSTRACT

A fuel cell arrangement comprises a fuel cell current source, peripheral units, a regulated hydrogen source for the fuel cell current source, based on the hydrolysis of a hydride and furthermore an electronic control circuit for controlling the fuel cell current source and an electronic control circuit for controlling the hydrogen source. The control circuit, for the fuel cell current source and the control circuit, for the hydrogen source are coupled together and the control of the current source and the hydrogen source carried out with mutually related adjustment.

22 Claims, 2 Drawing Sheets

FUEL CELL ARRANGEMENT AND METHOD FOR OPERATION THEREOF

This application claims the benefit of German Application No. 100 65 269.7 filed Dec. 29, 2000 and PCT/DE01/04803 filed Dec. 19, 2001.

BACKGROUND OF THE INVENTION

The invention relates to a fuel cell arrangement including a fuel cell current source, peripheral units and a controlled hydrogen source associated to the fuel cell current source, based on the hydrolysis of a hydride, and furthermore including an electronic control circuit for controlling the fuel cell current source, this circuit exhibiting at least one terminal for an operational signal, and including an electronic control circuit for controlling the hydrogen source, this circuit exhibiting at least one input terminal for an operational signal of the control circuit of the fuel cell current source and at least one output terminal connected to the hydrogen source for control signals with the help of which the operational state of the hydrogen source can be influenced; the invention relates furthermore to a method for the operation of the fuel cell arrangement.

The fuel cell arrangements to which the invention relates can consist of one or several fuel cells, in particular connected in series in the form of a fuel cell stack, with peripheral units such as valves, fans, control means for influencing the output power etc. For their operation gaseous hydrogen is required.

It is known per se to use hydroborons as hydrogen source, wherein metal ions serve for charge compensation. The best known hydride used for this purpose is sodium borohydride $NaBH_4$; it is, however, also possible to use $LiBH_4$, $Al(BH_4)_3$, $Mg(BH_4)_2$ etc. These substances can be used dissolved in aqueous, preferably slightly alkaline solution, but also in other suitable solvents. The hydrolysis of the hydride is started by the presence of a catalyst or by an acid medium. In this connection reference is made to the article by Schlesinger et al. "Sodiumborohydride, its Hydrolysis and its Use as a Reducing Agent and in the Generation of Hydrogen", in J. Am. Chem. Soc. 1953, 75, 215–219. It is also known to use such substances as hydrogen source for fuel cells.

For generating gas from a liquid as a result of a catalytic reaction, it is further known to control the reaction by means of the gas pressure above the liquid level and the thus resulting displacement of liquid away from the catalyst into vessel departments with lower gas pressure. In this way, the liquid is displaced from the area of a catalyst bed by means of the pressure of the generated gas if the gas is not required and thus not discharged; afterwards, when the gas is discharged, the liquid returns and gets again into contact with the catalyst bed. Such a control system, however, is relatively sluggish and insensitive to various reaction parameters which have an influence on the operation.

Such reaction parameters which have an influence on the reaction speed are e.g. the temperature and the state of the solution. The amount of catalyst and the size of the reaction space have to be adapted to the most unfavourable conditions. However, this can lead to a non-controllable overproduction in the case of favourable conditions, i.e. a to high reaction speed.

Advantageously, both the fuel cell current source and the hydrogen source are controlled by means of electronic control circuits. The current source provides a current adjusting itself, supplied to a load such as an incandescent lamp, or e.g. for the operation of a vehicle it gets a power demand signal by a control measure of the vehicle operator. The gas generation in the hydrogen source has to be timely adapted to the fuel requirements of the current source and consequently has to follow it in the case of changes.

SUMMARY OF THE INVENTION

By means of the invention the possibilities for a proper control or regulation are to be provided.

According to a first step of the invention this is done by means of a fuel cell arrangement which is characterized in that the output terminal of the control circuit of the fuel cell current source is coupled to the corresponding input terminal of the control circuit of the hydrogen source either directly or via intermediate links. Thus, it becomes possible that the hydrogen source is controlled directly in dependence on the current requirements on the fuel cell current source, which relates to an external signal or simply to the resistance of the connected load. Furthermore, an increased hydrogen consumption is caused during flashing of the anode space of the fuel cell current source with hydrogen in order to remove inert gases which had diffused into the space and to remove water accumulations, or during a momentary short circuit of one or several fuel cells which is caused intentionally by the control circuit of the fuel cells in order to regenerate these fuel cells. Since the predictable occurrence of these events is signalled to the control circuit in time, the control circuit can adjust the required hydrogen production accordingly. Apart from this soliloquy-like control, as a second step of the invention also a dialogue-like control of the hydrogen source and the current source is possible in that the control circuit of the hydrogen source has at least one output terminal for an operational state signal of the hydrogen source and the control circuit of the fuel cell current source has at least one control input terminal for this operational state signal connected to said output terminal, and by means of this signal influences the control of the fuel cell current source and/or of its peripheral units. Thus, it is possible to control also the operation of the fuel cell current source by the operational data of the hydrogen source. Finally, according to a third step of the invention it is also possible that the control circuit of the fuel cell current source has a control input terminal for a power demand signal and the control circuit of the hydrogen source has a control input terminal for a gas flow demand signal and that these two control input terminals of the two control circuits are coupled together. In this case of a power demand signal to the current source, this signal via the hydrogen source control circuit also controls the hydrogen source, which can react very quickly as a result.

Due to this cooperation of the control circuits it is advantageous if both control circuits are located on one and the same board and possibly use only one common microprocessor. For starting, both systems, i.e. the current source and the hydrogen source, require external energy from a start battery. Also here it makes sense if only one single battery is used for both systems. During the operation these then get the electrical energy for the pump, valves and other units from the power generated by the fuel cell current source. Preferably, the hydrogen source comprises a tank for a liquid containing the hydrolysable hydride and is provided with devices which cause the hydrolysis in a controlled manner, in particular by catalyst beds or by the use of acid mediums such as phosphoric acid, formic acid, acetic acid or hydrochloric acid. In the case of such acid mediums the choice of the acids is based on the following three aspects: as small as possible mass and small volume for the delivery of the required amount of hydrogen ions, for safety reasons low degree of acidity, however sufficient for the reaction, and the avoidance of non-soluble final products.

When using catalyst beds, the construction is preferred where different individual catalysts beds are arranged in separated reaction chambers which via individually controllable valves can be included in a circuit of the hydride-containing liquid. By means of such a division of the entire reaction space into several individually loadable chambers is it possible in the case of a relatively fresh solution and high temperature as well as relatively low deviation from the desired pressure in the gas chamber to use the reaction chambers with small catalyst bed, and in the opposite case to use the reaction chambers with large catalyst bed and in borderline cases to use all reaction chambers. The pressure in the vessel can thus well be kept under control and surplus pressures, which would be critical for the vessel and the control of the output pressure, or lack of pressure, which would be critical for the fuel cell, respectively, no longer occur.

The hydrogen source consists of several bulky components such as reaction chambers, filters, hoses, valves, a pump and the electronic control means. In order to be in command of the size and to create insensitive structures it is preferable that the tank has a housing which during operation is filled up to a predetermined level with the hydride-containing liquid and above this level contains a buffer gas volume wherein, if present, the separate reaction chambers and their valves as well as a pump in the tank housing integrated into the circulation of the hydride-containing liquid is arranged above or below the liquid level, and wherein, surrounded by the buffer gas volume, the electronic control circuits, a gas outlet device with a valve and a droplet filter as well as a pressure sensor which is connected via a data line connection with the control circuits and possibly further components are arranged in the tank housing above the liquid level. Due to this integration within the tank housing they only occupy their actual volume whereas the space in between is fully utilized.

Further details, advantages and developments of the inventions can be taken from the following description of preferred embodiments under reference to the drawings. The drawings show:

DETAILED DESCRIPTION OF THE PREFERRED EMBODIMENTS

Figure 1:
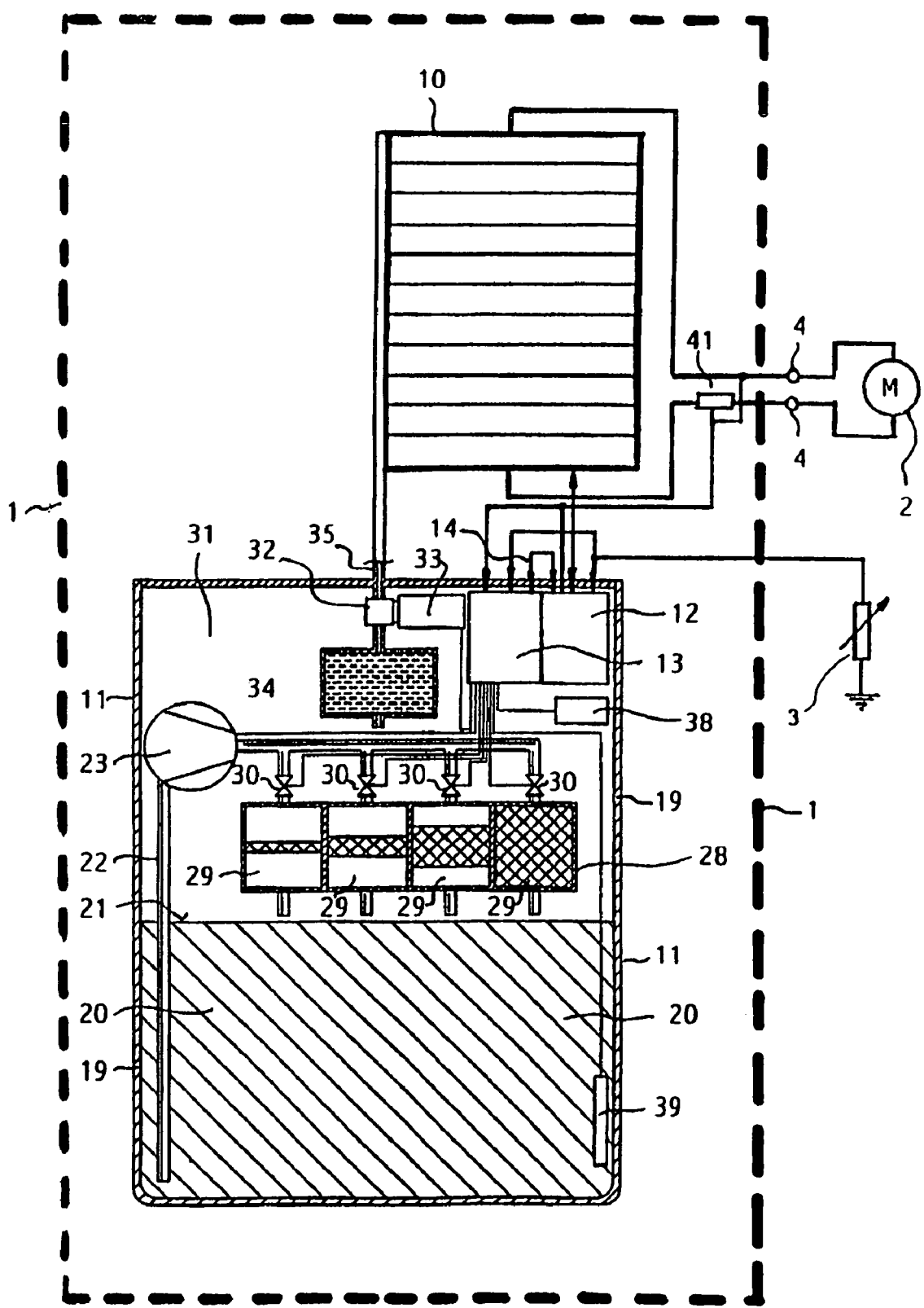
FIG. 1 a schematic view in partial cross-section of a first embodiment of the invention, FIG. 2 a comparable representation of a second embodiment of the invention.

FIG. 1 is a schematic view of a fuel cell arrangement used e.g. for an electromotor drive. In the described example, a fuel cell arrangement 1 which is shown in the drawing is used for supplying current to an electric motor 2 which—in turn exemplary—is the drive unit of a vehicle. The performance of the vehicle is determined by the adjustment of a command unit 3 which in a vehicle is referred to as "accelerator pedal" and in the drawing is shown as variable resistor. With its help a power demand signal is given to the fuel cell arrangement 1 with the help of which signal the output voltage of the arrangement 1 at power output terminals 4 and thus the motor output power can be influenced.

The fuel cell arrangement 1 includes as main components a current source in the form of a fuel cell stack 10 and a hydrogen source 11. In a manner known per se, from these two units 10 and 11 parameters are to be read and the operation is to be controlled, for the purpose of which the arrangement comprises an electronic control circuit 12 for the fuel cell stack and an electronic control circuit 13 for the hydrogen source. Both electronic control circuits 12 and 13 are located on a common board and coupled together as is symbolized by a control line 14 in the drawing. Matching of the two control circuits in relation to each other is provided for in that, depending on the collected electric current on the one hand and on the other operational parameters on the other hand, the generation of hydrogen is matched to the consumption of hydrogen which consumption is essentially proportional to the collected current. Deviations from the proportionality can occur due to flushing or momentary regeneration short circuits. It makes sense to hand over these events to the control of the hydrogen source as well.

The hydrogen source 11 is formed as a tank with a housing 19 which is closed with the exception of openings for the conduits and circuit wires, in which housing an aqueous solution of $NaBH_4$ is contained up to a level 21. Via a suction pipe 22 a pump 23 revolves the solution 20 by sucking in the solution below the level and returning it to the tank reserves via a catalyst bed 28. The catalyst causes hydrolysing of the $NaBH_4$ in the solution, thus producing on the one hand hydrogen gas and on the other hand sodium borate, i.e. a water-soluble inert salt. Different materials are suitable as catalyst, e.g. ruthenium, cobalt or Raney nickel.

The catalyst bed 28 is divided into several separate reaction chambers 29 each of which contains a different amount of the catalyst and is connected to the exit of the pump 23 via a respective valve 30. By controlling the pump rate of the pump 23 and the valves 30 as well as in dependence on parameters such as the $NaBH_4$ content of the solution and temperature of the solution, the gas generation is adjusted to the present and to the predictable future demand.

The generated gas fills the volume 31 in the housing 19, which serves as buffer gas volume. In this buffer volume 31 the pressure can be chosen higher than is required by the fuel cell. By delaying the end of the hydrogen generation when the current collection is suddenly stopped, on the one hand, and by delaying of the start of the increased hydrogen generation in the case of a sudden higher current collection on the other hand, the pressure of the volume 31 rises or falls, respectively, thus causing the buffer effect. The delays result from the time required until the solution is pumped into the reaction chambers 29 or removed from them, respectively, which in part occurs by draining and in part is carried out by reverse pumping by the pump 23. Moreover, it is not possible to pump out all the solution since due to the capillary effect some of the solution is absorbed by the catalyst bed. This solution will complete the reaction in any case. At the gas outlet there is a pressure reducer 32 in the form of a proportional valve for the final adjustment of the pressure, which valve is controlled by a valve control 33 corresponding to the guidelines by the control circuits 12 and 13.

At first, apart from the water vapour the generated gas contains small droplets from the solution, too. These droplets are alkaline and would be suitable to poison the membranes in the fuel cell stack 10. For this reason, the hydrogen gas is conducted through a filter 34 which consists of a mechanical fine filter and a downstream ion exchanger.

Finally, the hydrogen gas is given off at a gas nipple 35, having the pressure necessary for the required gas flow.

The pressure variation range in the buffer gas volume advantageously can amount from 0.5 to 10 bar. In order to determine this value a pressure sensor 38 is located inside the housing 19 which sensor communicates the measured value to the control circuit 13. Furthermore, there is a temperature sensor 39 which communicates the temperature of the solution 20 to the control circuit 13. Both measured values are part of the control strategy.

The various components of the gas generator such as the pump 23, the catalyst bed 28 with the reaction chambers 29, the valves 30, the pressure reducer 31 with the valve control 32, the filter 33 and the sensors 38 and 39, pipe and hose connections between these elements and furthermore the control circuits 12 and 13 are located in the housing 19 of the tank of the hydrogen source 11. Thus, towards the outside it is a closed housing with several connections whereas the bulky parts are all located inside the tank and in particular above the level 21 in the gas volume 31. The gaps between these bulky parts thus serve as buffer volume or liquid storage volume.

From the electronic control circuits 12 and 13 a number of measuring and command data lines depart, which are in part shown only schematically and not all of which are provided with reference numerals. Such lines are shown on the one hand from the sensors 38 and 39 to the control circuit 13 and on the other hand from this control circuit 13 to the pump 23, the valves 30 and the valve control 33. The control circuit 12 which controls the gas flow and the cooling in the fuel cell stack 10 receives signals from a power sensor 41 which signals provide information on the current and voltage at the output terminals of the stack 10, as well as a power demand signal from the command unit 3. The power sensor 41 is shown schematically as a sensor which supplies a current signal and a voltage signal, however also a simple current signal is enough. The power demand signal from the command unit 3 is also fed to the control circuit 13, likewise the data from the power sensor 41. Via the control line 14 the two control circuits exchange further data which lead to interpretable results. Due to this input into the control circuit 13 the gas production can be adjusted precisely and quickly by means of the pump rate and the choice of the reaction chambers.

Once the solution is used up, which results in a too low hydrogen pressure, the fuel cell stack 10 has to reduce its output power and to switch off completely as soon as a lower threshold value is reached since otherwise the danger arises that some cells receive too little hydrogen, which might lead to irreversible damage to the cells.

Due to the measuring of the amount—in ampere seconds—of charge given off since the last new filling of the tank with fresh solution, the system is able to calculate and display the still available energy reserve. Therefore, when the tank is filled with fresh solution, a corresponding start signal has to be given to the electronic circuits 12 and 13.

Depending on the temperature in the volume 31 the generated hydrogen also contains water vapour. In principle, this is advantageous for the fuel cells in the stack 10 since it prevents the drying out of the membranes. The moisture content of the hydrogen, however, varies greatly with the temperature which is low at the start and later amounts to 50 to 70° C. for example. With the variation of the moisture amount the optimal operational temperature of the fuel cells varies as well. Therefore, the control circuit 13 of the hydrogen source communicates the temperature in the tank to the control circuit 12 of the fuel cell stack so that the desired operational temperature of the stack is adjusted.

Figure 2:
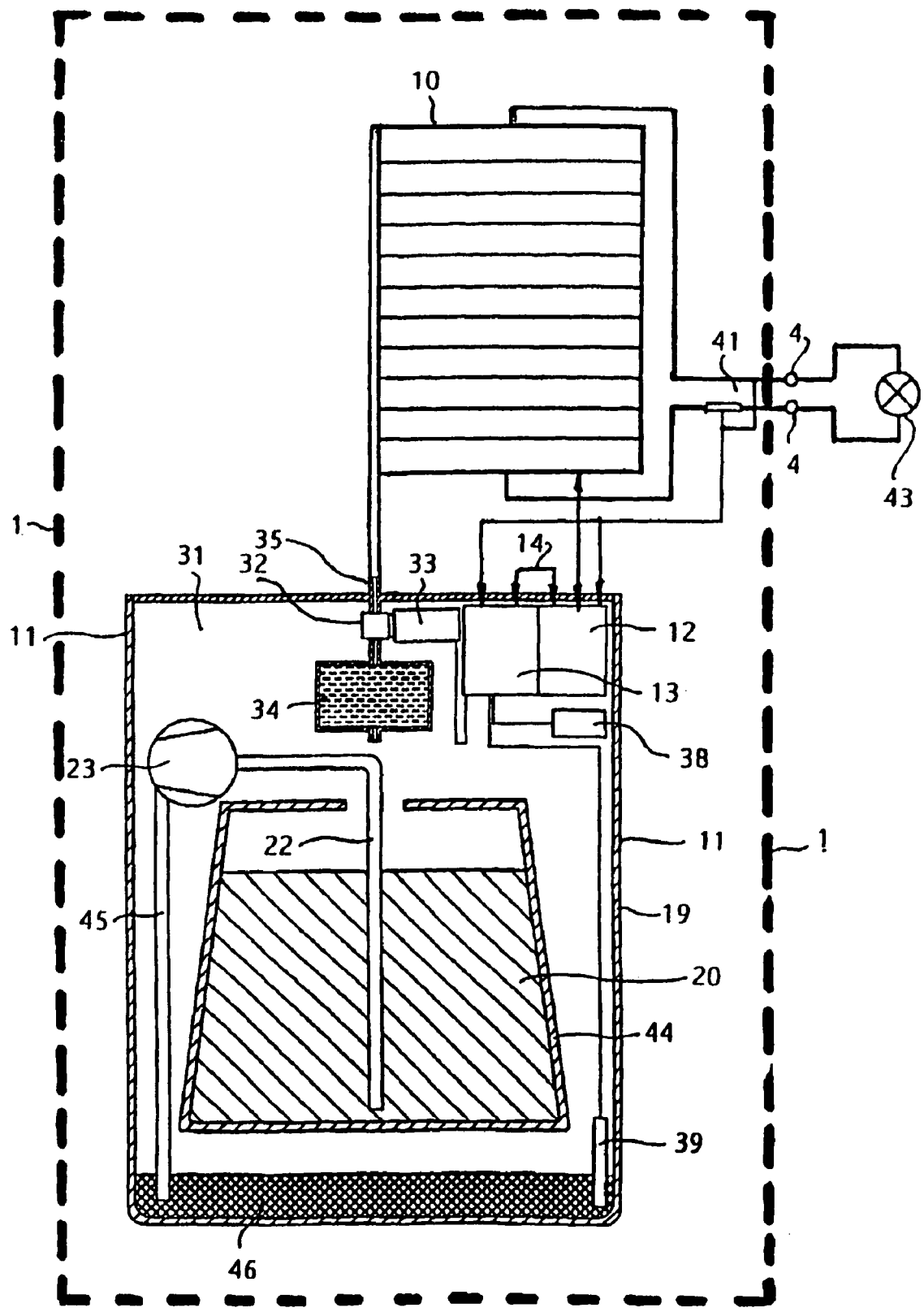

FIG. 2 shows a system which differs in two aspects. The electric load is not a motor but an incandescent lamp 43 without the possibility of adjusting the light intensity. Thus, the command unit 3 of FIG. 1 is missing. Only the electric actual power is determined. And the hydrogen generation is not carried out by catalytic reaction but in a manner known per se by acid medium. In acid medium, the hydrolysis of the $NaBH_4$ starts even without catalyst. According to FIG. 2 the solution 20 is located inside the housing 19 in an inner vessel 44 from which it is pumped in the right dose via an output pipe 45 into an acid bath 46 with the help of the suction pipe 22 and the pump 23.

A further variation on the arrangement of FIG. 2 is to use instead of the acid bath 46 a solution or a suspension of catalyst material, which is located in the corresponding department of the tank. The latter is in particular advantageous compared to a catalyst bound in catalyst beds, if resulting in low costs and minor disposal problems when the used-up solution with the catalyst particles contained therein has to be exchanged.

Due to the arrangement shown also the various reaction chambers 29 become superfluous. As a result, the control system as a whole is simplified, nevertheless, however, the communication between the control circuits 12 and 13 is of advantage.

In a way which is not shown in the drawings the control of the current collection can also be carried out externally, e.g. by a clocking. Here, typically into the power circuit a MOS-FET (transistor) is integrated which is triggered via PWM (pulse width modulation) and in the rhythm of pulse and pause becomes conductive and blocks again; it makes sense if these components are not located in the tank since they require external cooling.

The invention claimed is:

1. A fuel cell arrangement comprising a fuel cell current source, peripheral units and a controlled hydrogen source associated to the fuel cell current source, based on the hydrolysis of a hydride, furthermore including a first electronic control circuit for controlling the fuel cell current source, the first control circuit exhibiting at least one terminal for an operational signal, and including a second electronic control circuit for controlling the hydrogen source, the second control circuit exhibiting at least one input terminal for an operational signal of the first control circuit of the fuel cell current source, and at least one output terminal connected to the hydrogen source for control signals with the help of which the operational state of the hydrogen source can be influenced, wherein the output terminal of the first control circuit of the fuel cell current source is directly coupled together with the respective input terminal of the control second circuit of the hydrogen source.

2. The fuel cell arrangement according to claim 1, wherein the second control circuit of the hydrogen source has at least one output terminal for an operational state signal of the hydrogen source, and the first control circuit of the fuel cell current source has at least one control input terminal with a connection to said output terminal for the operational state signal of the hydrogen source, and by means of the operational state signal influences the first control circuit for control of the fuel cell current source and/or its peripheral units.

3. The fuel cell arrangement according to claim 1, wherein the first control circuit of the fuel cell current source has a control input terminal for a power demand signal and the second control circuit of the hydrogen source has a control input terminal for a gas flow demand signal and these two control input terminals of the two control circuits are coupled together.

4. The fuel cell arrangement according to claim 1, wherein the first and second electronic control circuits are microprocessor circuits and are located on a common board.

5. The fuel cell arrangement according to claim 4, wherein the first and second electronic control circuits use a common microprocessor.

6. The fuel cell arrangement according to claim 1, wherein the fuel cell current source, the hydrogen source and the first and second control circuits are connected to a common starter battery.

7. The fuel cell arrangement according to claim 1, wherein the hydrogen source comprises a tank for a liquid containing the hydrolysable hydride and is provided with means which cause the hydrolysing in a controlled manner.

8. The fuel cell arrangement according to claim 7, wherein the means causing the hydrolysing are catalyst beds.

9. The fuel cell arrangement according to claim 7, wherein the means causing the hydrolysing are arranged to add hydrolysable hydride to an acid or to non-bound catalyst material.

10. The fuel cell arrangement according to claim 8, wherein several catalyst beds with different amounts of catalyst can each be contacted selectively with the hydride-containing liquid.

11. The fuel cell arrangement according to claim 10, wherein the individual catalyst beds are positioned in separate reaction chambers which can be made part of a circulation of the hydride-containing liquid via separately controllable valves.

12. The fuel cell arrangement according to claim 7, wherein the tank has a housing which during operation is filled up to a predetermined level with the hydride-containing liquid and contains a buffer gas volume above this level.

13. The fuel cell arrangement according to claim 11, wherein the separate reaction chambers and their valves as well as a pump in the tank housing which pump forms part of the circulation are arranged above or below the liquid level.

14. The fuel cell arrangement according to claim 13, wherein in the tank housing above the liquid level the electronic control circuits a gas outlet device with a valve and a droplet filter as well as a pressure sensor which is connected with the control circuits via a data line are located, surrounded by the buffer gas volume.

15. The fuel cell arrangement according to claim 7, wherein the electronic control circuits are connected via a data line with at least one temperature sensor located in the tank.

16. The fuel cell arrangement according to claim 1, wherein the electronic control circuits comprise a means for measuring the amount of electric charge delivered by the fuel cell current source and a means for bringing into relation to each other this amount of charge with the total amount of charge which can be provided by the reserve of hydrolysable hydride via the hydrogen generation and the fuel cell current source reaction.

17. A method for the operation of a fuel cell arrangement comprising a fuel cell current source and a hydrogen source according to claim 1, wherein the hydrogen source is controlled directly in dependence on the power demand directed to the fuel cell current source.

18. The method according to claim 17, wherein the operational data of the hydrogen source is used to control the operation of the fuel cell current source as well.

19. The method according to claim 18 for the operation of the fuel cell arrangement, wherein the fuel cell current source additionally is controlled in dependence on the pressure of the hydrogen generated, in the buffer gas volume of the tank.

20. The method according to claim 19, wherein in case of a decrease in pressure below given thresholds the further electric power output is reduced and finally stopped.

21. The method according to claim 18, wherein the desired temperature of the fuel cell current source is controlled in dependence on the actual temperature of the hydrogen source.

22. The method according to claim 17, wherein as starting substance for the hydride hydrolysis an aqueous solution of a metalborohydride, preferably of sodiumborohydride $NaBH_4$ is used.

* * * * *